(12) United States Patent
Smith et al.

(10) Patent No.: US 12,340,290 B1
(45) Date of Patent: Jun. 24, 2025

(54) APPARATUS AND METHOD FOR LOCAL OPTIMIZATION USING UNSUPERVISED LEARNING

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/609,844

(22) Filed: Mar. 19, 2024

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

2004/0059621 A1  3/2004  Jameson

FOREIGN PATENT DOCUMENTS

| CN | 110930028 A | 3/2020 |
| CN | 117252372 A | 12/2023 |
| IN | 202321082070 A | 12/2023 |

OTHER PUBLICATIONS

Li, et al., Methods of Resource Scheduling Based on Optimized Fuzzy Clustering in Fog Computing, Sensors 2019, 19(9), 2122, May 8, 2019, pp. 1-16 (Year: 2019).*

* cited by examiner

*Primary Examiner* — Wilbert L Starks
(74) *Attorney, Agent, or Firm* — Caldwell Intellectual Property Law

(57) ABSTRACT

An apparatus and methods for local optimization using unsupervised learning is disclosed. The apparatus comprises at least a processor and a memory to identify a first stage of a process, wherein the first stage includes a plurality of candidate subsequent stages and a plurality of potential resources, each resource of the plurality of resources having a plurality of attributes, select an optimal resource of the plurality of potential resources, apply a local optimization constraint, wherein the local optimization constraint further comprises the selected resource, identify a subsequent stage of the plurality of stages using a local optimization process having the local optimization constraint and execute the process using the first stage and the subsequent stage. The method comprises a machine learning model to execute the process described above.

16 Claims, 7 Drawing Sheets

APPARATUS AND METHOD FOR LOCAL OPTIMIZATION USING UNSUPERVISED LEARNING

FIELD OF THE INVENTION

The present invention generally relates to the field of machine learning and modeling. In particular, the present invention is directed to an apparatus and method for local optimization using unsupervised learning.

BACKGROUND

Current methods for local optimization using unsupervised learning may be insufficient; challenges in effectively managing multi-stage processes that involve a plurality of resources, each with distinct attributes make local optimization difficult. These processes, ranging from project management to resource allocation, are inherently complex and dynamic, often requiring significant computational resources and time for optimal execution. Traditional computational approaches attempt to simplify these complex problems by breaking them down into more manageable sub-problems or local optimizations. While this method can indeed conserve computational resources and reduce processing time, it frequently falls short in accurately representing the intricacies and interdependencies inherent in the original, more complex process. This simplification often leads to solutions that do not fully address the unique characteristics and requirements of each stage in the process or the specific attributes of the various resources involved.

SUMMARY OF THE DISCLOSURE

In an aspect, an apparatus for local optimization using unsupervised learning is described. The apparatus includes at least a processor and a memory communicatively connected to the at least a processor, wherein the memory containing instruction configuring the at least a processor to identify a first stage of a process, wherein the first stage includes a plurality of candidate subsequent stages and a plurality of potential resources, each resource of the plurality of resources having a plurality of attributes, the at least a processor is configured to select an optimal resource of the plurality of potential resources, wherein selecting further comprises, generating, for each resource of the plurality of resources, using a clustering algorithm and the plurality of attributes, at least an attribute cluster, identifying, for a resource of the plurality of resources, an outlier cluster of the at least an attribute cluster and selecting the resource based on the outlier cluster, the at least a processor is configured to apply a local optimization constraint, wherein the local optimization constraint further comprises the selected resource, identify a subsequent stage of the plurality of stages using a local optimization process having the local optimization constraint and execute the process using the first stage and the subsequent stage.

In another aspect, a method for local optimization using unsupervised learning is described. The method includes identifying, using at least a processor, a first stage of process, wherein the first stage includes a plurality of candidate subsequent stages and a plurality of potential resources, each resource of the plurality of resources having a plurality of attributes, selecting, using the at least a processor, an optimal resource of the plurality of potential resources, wherein selecting further includes generating, for each resource of the plurality of resources, using a clustering algorithm and the plurality of attributes, at least an attribute cluster, identifying, for a resource of the plurality of resources, an outlier cluster of the at least an attribute cluster, and selecting the resource based on the outlier cluster, applying, using the at least a processor, a local optimization constraint, wherein the location optimization constraint further comprises the selected resources, identifying, using the at least a processor, a subsequent stage of the plurality of stages using a local optimization process having the local optimization constraint and executing, using the at least a processor, the process using the first stage and the subsequent stage.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for local optimization using unsupervised learning. In an embodiment, the apparatus and methods are designed to analyze multi-stage processes within an organization or system, utilizing unsupervised learning techniques to identify and optimize the allocation of resources at each stage.

Aspects of the present disclosure can be used to streamline complex decision-making processes in a diverse range of industries, from manufacturing to digital marketing. Aspects of the present disclosure can also be used to dynamically adapt to changing conditions within a process, allowing for real-time adjustments and continuous improvement. This is so, at least in part, because the unsupervised learning algorithms employed in these methods are capable of processing large datasets, identifying underlying patterns, and making predictive analyses. This enables the apparatus to not only make initial resource allocation decisions but also to adjust these decisions as new data becomes available, ensuring that the optimization remains relevant and effective over time.

Figure 1:
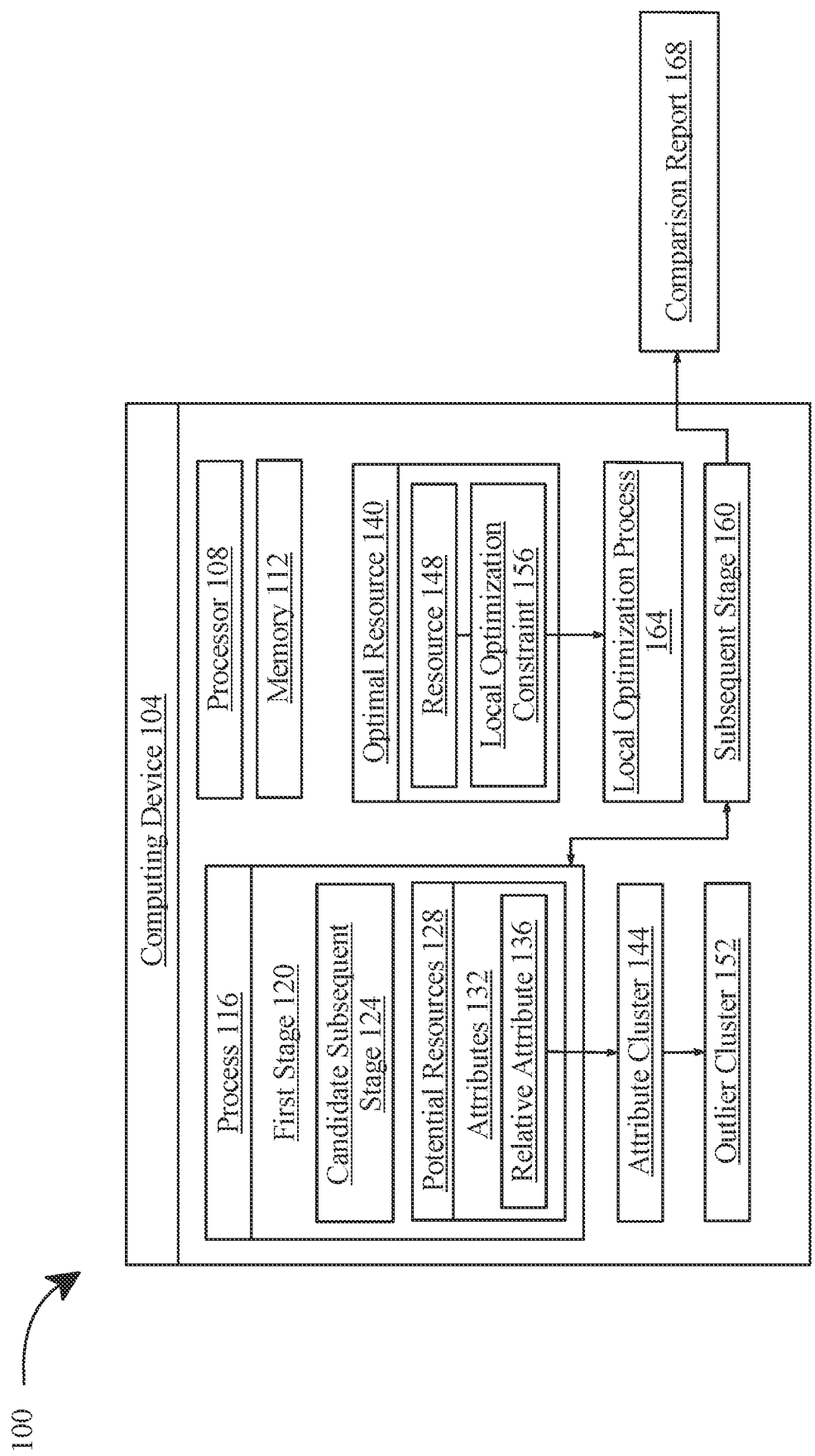
FIG. 1 is a block diagram of an exemplary apparatus for local optimization using unsupervised learning.

Referring now to FIG. 1, an exemplary embodiment of an apparatus 100 for local optimization using unsupervised learning is illustrated. Apparatus includes a computing device. Computing device includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing device 104 operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 104 communicatively connected to at least a processor 108. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 and/or computing device 104 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Still referring to FIG. 1, apparatus 100 for local optimization using unsupervised learning comprises at least one processor 108 and a memory 112 communicatively connect to the at least a processor 108, wherein the memory 112 containing instructions configuring the at least processor 108 to identify a first stage 120 of a process 116. As used in this disclosure, a "process" is a series of actions or steps taken to achieve a specific goal or objective. The process may encompass a wide range of activities, including but not limited to computing, business operations, project management, fundraising initiatives, developmental programs, and strategic planning. In this context, process 116 may refer to a goal-oriented activity such as launching a new product, organizing a fundraising event, executing a marketing campaign, developing new software, conducting research, or even broader organizational endeavors like restructuring a company or driving innovation. Process, as described here, may be flexible and adapted to various contexts and industries, always aiming towards achieving defined outcomes, improving performance, or contributing to the growth and development of a company or organization. As used in this disclosure, a "first stage" is a preliminary phase in a process where initial evaluations and decisions are made. The first stage 120 may involve analyzing various options, factors, or conditions that are critical to the direction and outcome of process 116. First stage 120 may set the foundation for subsequent stages, influencing the overall strategy and effectiveness of the process. It may involve gathering data, assessing resources, determining goals, or identifying potential challenges. In some embodiments, first stage may include activities like data pre-processing in a data analysis workflow, initial planning in project management, or resource allocation in manufacturing processes. For instance, in the field of environmental management, a company may use apparatus 100 to optimize resource allocation for sustainability projects. The desired outcome could be reducing the carbon footprint while maximizing cost-effectiveness, leading to both environmental and economic benefits.

With continued reference to FIG. 1, first stage 120 comprises a plurality of candidate subsequent stages. As used in this disclosure, a plurality of "candidate subsequent stages" refers to a range of possible future phases or steps that follow the initial first stage 120 in process 116. Candidate subsequent stages 124 may represent various paths or options available for progression after the completion of first stage 120. Each candidate subsequent stage may offer a different approach or outcome, thereby allowing for flexibility and adaptability in process 116. The choice among candidate subsequent stages may be based on factors such as the results or insights gained from first stage 120, specific goals of the overall process, resource availability, or other strategic considerations. In a broader context, candidate subsequent stages may include different operational strategies, project milestones, developmental paths, or decision points, each leading process 116 towards its ultimate goal or objective. As a non-limiting example, a company utilizes apparatus to enhance its internal operational processes, which may be refer to as back stage processes. Processor may be programmed to identify the initial phase of a specific back stage process as first stage. This may be, for instance, process of onboarding new employees. During first stage, apparatus may determine several candidate subsequent stages based on the initial onboarding procedures. These subsequent stages may include different paths such as initial training sessions, integration into project teams, or orientation with company culture and policies. Each stage represents a different aspect of the employee onboarding process, and the choice of which subsequent stage to proceed with is dependent on the outcomes of the initial phase. For example, initial onboarding may indicate a new employee has prior experience with certain tools or procedures used in the company, subsequent stage could directly involve integration into project teams, skipping certain basic training sessions. Alternatively, if the employee is new to the industry, the next stage might focus more on comprehensive training and gradual integration. In this example, processor may help structure and organize the onboarding process (a Back Stage process) in a way that ensures smooth and efficient integration of new employees, thereby contributing positively to the company's overall workflow and front stage results.

With continued reference to FIG. 1, first stage 120 comprises a plurality of potential resources 128, each resource of the plurality of resources having a plurality of attributes 132. As used in this disclosure, a plurality of "potential resources" refers to a range of available assets, tools, or inputs that may be utilized in the execution or facilitation of first stage 120 of process 116. Potential resources may vary widely in nature and may include, but are not limited to, physical materials, human expertise, technological tools, financial assets, time allocations, or informational assets. Each resource in this plurality is characterized by unique attributes or properties that make it suitable for specific tasks or roles within the first stage of the process. As used in this disclosure, a plurality of "attributes" refers to the various characteristics, properties, or qualities that define and distinguish each resource within the potential resources. The plurality of attributes may encompass a wide range of factors such as cost, efficiency, availability, capacity, reliability, performance metrics, compatibility with other resources or stages in process 116, and specific functional capabilities.

With continued reference to FIG. 1, in an embodiment, plurality of attributes 132 may include a selection mechanism configured to identify at least a relevant attribute 136. used in this disclosure, a "relevant attribute" is a characteristic, feature, or quality of a resource that is related to the specific requirements, objectives, or conditions of first stage or process. Relevant attribute may be identified from the broader set of attributes based on its significance in contributing to the efficiency, effectiveness, or success of process. As used in this disclosure, a "selection mechanism" is a computational tool or module within the apparatus, designed to evaluate and choose the appropriate attributes from a given set. Selection mechanism may function by applying predefined criteria or algorithms to analyze the various attributes of resources, identifying various attributes of resources that best align with the specific requirements and objectives of a particular process or process stage. Selection mechanism may operate through data gathering, attribute analysis, application of selection criteria, and final determination of the most relevant attributes. Selection criteria used by the mechanism can be diverse, encompassing factors like cost-efficiency, time-saving potential, compatibility with other resources or stages, performance efficiency, or innovation potential. Selection mechanism may be equipped with the capability to process large datasets, employ statistical and machine learning techniques, and adapt to different types of resources and process requirements. Selection mechanism may also include ranking attributes based on attribute relevance, scoring them according to selection criteria, and may use decision-making algorithms to select the most pertinent attributes. For instance, time efficiency may be a key requirement in the first stage of a process, selection mechanism may prioritize identifying and selecting resource attribute that directly contributes to minimizing time expenditure. Procedure may involve analyzing attributes such as speed of operation, ease of integration, or the ability to automate tasks. Selection mechanism may employ a combination of algorithmic processes, data analysis techniques, and possibly machine learning algorithms to systematically evaluate and compare the attributes against the set parameters, thereby identifying attribute or combination of attributes that best meets process needs. In a non-limiting example, a company may be using apparatus 100 to optimize its digital marketing campaign, identified as first stage 120 of a broader marketing process. First stage may comprise a plurality of potential resources 128, such as different digital marketing tools, platforms, and human expertise. Each of these resources may include a plurality of attributes 132, encompassing factors like user engagement rates, cost, ease of use, analytics capabilities, and integration with other marketing tools. Apparatus 100 may include a selection mechanism designed to sift through attributes and identify at least one relevant attribute 136 for each resource. Primary goal of the operation may be defined, may be achieved through an initial input phase where key objectives and targets of process may be specified by the user or inferred from process data. For example, in a digital marketing campaign, the user of apparatus may be a marketing manager, primary goal of the campaign may be input into the system. Alternatively, apparatus may analyze historical campaign data to infer the primary goal. After primary goal may be established, selection mechanism may activate its analytical protocols to sift through various attributes of the resources. If the specified goal of the digital marketing campaign is to maximize user engagement, selection mechanism may employ algorithms to prioritize and assess attributes related to this goal. In this case, it may evaluate the 'user engagement rate' of each digital marketing tool, alongside other possibly relevant attributes like click-through rates or social media shares. Selection mechanism may use a combination of data analytics, pattern recognition, and possibly machine learning techniques to rank and identify the most pertinent attributes for each resource, relative to the established goal. Apparatus 100 may help streamline the decision-making process by pinpointing the most critical attributes needed for the campaign's success, ensuring that the resources chosen for the first stage are optimally aligned with the company's marketing goals.

Still referring to FIG. 1, apparatus 100 comprises memory 112 containing instructions configuring at least processor 108 to select an optimal resource 140 of plurality of potential resources 128. In this disclosure, an "optimal resource" is the resource that most effectively meets the specific needs and objectives of a given stage or process, selected from a range of available options. Processor 108 may gather and analyze data on each of potential resources 128, focusing on a variety of attributes 132 such as cost, performance efficiency, availability, and specific capabilities relevant to the task at hand. Processor 108 may evaluate attributes 132, potentially assigning different weights to them based on their importance relative to the process goals. Processor may be configured to use comparative analysis and ranking algorithms to assesses resources and rank them according to how well they align with the weighted attributes. Techniques such as multi-criteria decision-making or optimization algorithms may be used. Processor may identify resource that scores highest in meeting the established criteria, to select optimal resource 140, processor may be configured to identify resource that scores highest in meeting the established criteria. For instance, in a digital data analysis task, potential resources like various software tools would be evaluated based on attributes such as processing speed, data handling capabilities, and cost, leading to the selection of the software that offers the best balance of these attributes within the context of the task's requirements.

With continued reference to FIG. 1, in an embodiment, selecting optimal resource 140 may further involve using an unsupervised learning algorithm. Unsupervised learning algorithms may be a subset of machine learning techniques designed to analyze and cluster unlabeled datasets, identifying hidden patterns or groupings within the data without explicit human guidance. Unsupervised learning algorithms may be adept at discovering intrinsic structures in data, such as similarities and variances among data points, which may not be immediately apparent. In the context of selecting optimal resource 140, processor 108, may be equipped with such an algorithm, data on the attributes of each potential resource 128 may be gathered. Attribute data could encompass a wide range of characteristics, from quantitative metrics such as cost and efficiency to qualitative factors like usability or adaptability. Processor 108 may then apply an unsupervised learning algorithm, such as k-means clustering, hierarchical clustering, or principal component analysis, to this dataset. Unsupervised learning algorithm may sort and group resources based on similarities and differences in attributes, clustering resources into categories. Clustering process may allow processor 108 to analyze resources in a structured manner, identify which groups of resources share desirable attributes that may align with the needs of process 116. For example, a cost-efficiency and high performance may be the priority, Unsupervised learning algorithm may highlight a cluster of resources that exhibit these characteristics. Processor 108 may discern and select the resource from this cluster that best meets the process's goals, optimal resource 140 may be determined.

With continued reference to FIG. 1, processor may select an optimal resource using an optimal resource machine-learning model. Optimal resource machine-learning model may be consistent with any type of machine-learning model disclosed in this disclosure. Optimal resource machine-learning model may be trained using optimal resource training data. Optimal resource training data may include a plurality of potential resources correlated to optimal resources. Optimal resource training data may include a plurality of potential resources including attributes correlated to optimal resources. Optimal resource training data may include a plurality of potential resources and associated first stages correlated optimal resources. Optimal resource training data may be retrieved from a training data database.

With continued reference to FIG. 1, in another embodiment, apparatus 100 may be further configured to automatically update of the optimal resource and in response to change in process 116. Enable updates may be achieved through a dynamic and adaptive system within apparatus 100 may monitor and assess process 116 for changes or shifts in requirements, conditions, or objectives. Apparatus 100 may be configured to facilitate by a combination of real-time data collection, ongoing analysis, and machine learning algorithms. Processor 108 may be configured to receive and process updated data related to process 116, which may include changes in resource availability, fluctuations in process parameters, or alterations in end goals. Updated data may be input by a user through a user interface, such as a graphical user interface (GUI). The GUI may be designed to allow users to easily input or modify data related to process 116, such as updating resource availability or changing project objectives. The interface is intuitive, ensuring that users can accurately and efficiently convey the updates to apparatus. Upon submission of updated data via the GUI, apparatus 100 may employ event handlers that are designed to detect submissions. Event handlers may act as triggers, initiating the process of data analysis each time new information is received. When event handlers detect an update, event handlers may signal processor 108 to begin the re-evaluation process. Processor 108, in response to event handlers, may start analyzing the new data in real-time. Processor may employ pre-established criteria and algorithms to reassess potential resources 128 in the context of the updated conditions of process 116. Reassessment may consider how the recent changes affect the suitability of the currently selected optimal resource 140. If the analysis reveals that a different resource from the pool would now be more suitable given the new conditions, apparatus may automatically update optimal resource 140 to the newly identified selection. This update may be a reactionary change and a calculated decision based on predictive analysis and forecasting, leveraging advanced machine learning techniques to anticipate future trends and requirements of the process. For example, apparatus may be used in digital marketing and there may be a shift in market trends or consumer behavior, processor 108 may automatically reassess the digital marketing tools being used. Processor 108 may update the selection to a tool better suited to the new market dynamics, ensuring that the marketing process remains effective and aligned with its objectives. In the context of digital marketing, apparatus 100 may analyze various online advertising tools to identify the most effective platform, thus enabling the company to achieve higher engagement rates and a better return on investment in its marketing campaigns.

Still referring to FIG. 1, selecting optimal resource further comprises generating, for each resource of the plurality of resources, using clustering algorithm and the plurality of attributes 132, at least an attribute cluster 144. As used in this disclosure, an "attribute cluster" is a group or subset of resources that may be categorized based on the similarity or closeness of specific attributes. Attribute clusters may be formed by analyzing the attributes of each resource and finding patterns or commonalities that link certain resources together. For instance, one cluster may include resources that are particularly cost-effective, while another might group together resources known for their high efficiency. Clustering process may help in simplifying the decision-making process by categorizing resources into manageable groups based on key characteristics. When selecting optimal resource, processor may evaluate these clusters to determine which cluster aligns best with the specific needs and objectives of process. The resource within the identified cluster that most closely meets the criteria for the process may be then selected as optimal resource. The process of selecting the optimal resource from the identified cluster may be facilitated by attribute classifier. Attribute classifier may be trained to discern and prioritize the attributes of resources that best align with the specific criteria of process. Training of attribute classifier can be approached using supervised training methods with labeled training data or employing unsupervised training methods. Supervised training, attribute classifier may be trained using a dataset where each resource's attributes are labeled according to their relevance and effectiveness for various types of processes. Training data may be derived from historical process outcomes, expert evaluations, or industry benchmarks. Attribute classifier may learn to recognize patterns and correlations between attributes and the success of the process, allowing it to make informed selections about the most suitable resources for future processes. Alternatively, attribute classifier may also be trained using unsupervised learning methods, where no pre-labeled training data may be used. Instead, attribute classifier may analyze a dataset of resource attributes without prior categorization. Attribute classifier may identify inherent structures, patterns, and relationships within the data, learning to group resources based on similarities in attributes.

Still referring to FIG. 1, selecting optimal resource further comprises identifying, for a resource 148 of the plurality of resources, an outlier cluster 152 of the at least an attribute cluster 144. As used in this disclosure, a "resource" is any element or asset that can be utilized in the execution or facilitation of process. Resource may encompass a wide array of components such as physical materials, software tools, human skills, financial assets, or informational assets. Each resource may be characterized by attributes that determine its suitability and effectiveness for specific roles or tasks within a process. As used in this disclosure, an "outlier cluster" is a subset of resources within attribute cluster that deviates or differs from the norm or average characteristics of that cluster. Outlier clusters may be identified through advanced analytical methods configured to detect anomalies or unique patterns within the data. The identification of outlier clusters in the resource selection process may help resources to possess unique or exceptional attributes, which might be beneficial for specific needs or objectives of process. For example, an outlier cluster may consist of resources that are exceptionally efficient or cost-effective compared to others within the same attribute cluster, standout choices for certain tasks or processes. As a non-limiting example, a company may use apparatus to optimize its software development process. The company may have a variety of software tools and methodologies at its disposal, each constituting a resource with various attributes such as development speed, ease of use, integration capabilities, and cost-effectiveness. Using apparatus, each tool may be analyzed and grouped into attribute clusters based on these characteristics. For instance, within a cluster of tools categorized for high development speed, outlier cluster might consist of a specific tool that not only offers rapid development but also exceptionally integrates with other key systems used by the company. In an embodiment, outlier cluster 152 may include machine learning algorithms configured to dynamic update resource allocation. In a non-limiting example, a software development company want to optimize project management process. The company may employ apparatus to analyze various project management methodologies, each with attributes like time efficiency, cost, and team compatibility. Processor may identify outlier cluster, which may be referred to a specific methodology or resource characterized by its ability to adapt to rapidly changing requirements. Machine learning algorithms within this cluster may dynamically adjust resource allocations, such as reallocating team members or adjusting timelines, in response to project development changes. Dynamic approach may ensure the company's project management remains responsive and efficient, aligning with the ongoing needs of the software development projects and contributing to the successful delivery of products. In an embodiment, a technology company may use apparatus 100 to optimize software development lifecycle. Apparatus 100 may identify the most effective development methodologies and tools as optimal resources, leading to faster time-to-market and enhanced software quality.

Still referring to FIG. 1, apparatus 100 comprises memory 112 containing instructions configuring at least processor 108 to apply a local optimization constraint 156, wherein local optimization constraint 156 further comprises the selected resources. Local optimization constraint may be applied to process of resource selection and allocation within a given stage of a multi-stage process. Local optimization constraint 156 may be formulated based on attributes of the selected resources and the specific requirements and objectives of the current stage of process. When applying local optimization constraint, processor 108 may evaluate selected resources against the defined goals and limitations of the stage, such as time constraints, budget limits, resource availability, and desired performance outcomes. Processor may then adjust the resource allocation and utilization within that stage to meet constraints, ensuring the resources are used in the most effective and efficient manner. For example, if the constraint is related to minimizing time, processor may allocate resources to prioritizes speed and reduces processing time. Similarly, if cost-efficiency is a constraint, processor may favor resources that offer the best balance between cost and performance. As used in this disclosure, a "local optimization constraint" is a set of conditions or limitations applied to a specific portion or aspect of process 116, local optimization constraint may be designed to optimize the performance or outcome of particular portion. Unlike broader, system-wide optimizations, local optimization constraints may focus on enhancing efficiency, effectiveness, or other desired metrics within a narrowly defined scope or stage of process 116. Local optimization constraints 156 may be tailored based on various factors, including the characteristics of the selected resources, the specific goals of the stage, and the overall objectives of process 116. For example, local optimization constraint might limit the choice of resources to only those that maximize operational speed in a stage of process. Alternatively, in a cost-sensitive stage, the constraint might prioritize resources that offer the best cost-efficiency. In essence, local optimization constraints may be dynamic and adaptable, designed to ensure the best possible performance of process segment by intelligently leveraging the most suitable resources and strategies available for that specific context.

Still referring to FIG. 1, apparatus 100 comprises memory 112 containing instruction configuring at least processor 108 to identify a subsequent stage 160 of plurality of stages using a local optimization process 164 having local optimization constraint 156. As used in this disclosure, a "subsequent stage" refers to the next phase or step in process that may follow the current stage. The subsequent stage may be a part of a larger sequence of actions or activities within process, where each stage builds upon the completion of the prior one. Subsequent stage may be identified based on the outcomes, assessments, or decisions made in the preceding stage. As used in this disclosure, a "local subsequent stage" is a stage that directly follows and is closely linked to the preceding stage, particularly in the context of local optimization constraints and objectives. Local subsequent stage may be characterized by direct relevance and contribution to a localized aspect or segment of the overall process, focusing on achieving specific, short-term goals that are in line with the broader aims of process. In an embodiment, identifying subsequent stage 160 may further include an adjustment algorithm as a function of real-time data. In a non-limiting example, to optimize internal team management, apparatus may identify subsequent stage in team allocation, such as assigning team members to various projects based on their current workload and skill set. However, allocation may be subject to change based on real-time data. For instance, a team member may become unavailable due to unforeseen circumstances, adjustment algorithm may be integrated into apparatus quickly reassesses the team composition. Adjustment algorithm may then identify and suggest reallocating another suitable team member as the new subsequent stage, ensuring that the project continues without significant delays. In some embodiments, adjustment algorithm may include rerunning local optimization process using the updated data. In another embodiment, apparatus 100 may be further configured to update the optimal resource 140 and local optimization constraints 156. In a non-limiting example, a user may be preparing for a fundraising campaign. Initially, processor may select optimal resource for the campaign, such as a specific fundraising strategy or platform, based on current market trends and the user unique characteristics. Local optimization constraints may be factors such as budget limits, target investor demographics, and timeframes. As the fundraising campaign progresses, apparatus may continuously monitor market dynamics, investor responses, and the effectiveness of the chosen strategy. Suppose there may be a shift in investor interest or a change in market conditions. In that case, apparatus may update optimal resource, switch to a different fundraising platform or strategy that aligns better with the evolving situation. Concurrently, local optimization constraints may be adjusted to reflect changes, such as reallocating budget or extending timelines.

With continued reference to FIG. 1, local optimization process 164 may include a local optimization machine-learning model. Local optimization machine learning model may be configured to receive local optimization constraint 156 and a preceding stage as input and output subsequent stage 160. Local optimization machine-learning model may be trained using local optimization training data. Local optimization training data may include a plurality of local optimization constraints correlated to subsequent stages. In some embodiments, local optimization training data may include associated preceding stages and local optimization constraints correlated to subsequent stages. In some embodiments, local optimization training data may be retrieved from a database, such as a training data database. In some embodiments, local optimization training data may be updated using prior inputs and output of local optimization machine-learning model.

Still referring to FIG. 1, apparatus 100 comprises memory 112 containing instructions configuring at least processor 108 to execute the process using first stage 120 and subsequent stage 160. In an embodiment, apparatus 100 may further include a feedback module configured to collect and analyze user feedback data. In a non-limiting example, a technology company may be launching a new product. First stage may involve initial market research to identify target customer segments, subsequent stage may entail developing a marketing strategy tailored to these segments. As the product launch unfolds, feedback module may gather real-time responses from the initial customer base, analyzing initial customer reactions to the marketing strategy and the product. User feedback may enable processor to make informed adjustments. For example, feedback may indicate a particular feature of the product is highly appreciated, the company can decide to emphasize this feature in its marketing campaigns, refining marketing approach in subsequent stage. Additionally, feedback may suggest areas for improvement, such as additional functionalities or changes in pricing strategy, the company can quickly implement changes, making the product more appealing to its target market.

With continued reference to FIG. 1, in an embodiment, apparatus 100 may be configured to generate a comparison report 168 between potential resources 128 and optimal resources 140. As used in this disclosure, a "comparison report" is a detailed document or output generated by apparatus 100, comparison report may systematically compare and contrasts various elements within a given context. Generating comparison report may include apparatus 100 to collate a comprehensive set of data for each resource in both the potential and optimal categories. Data may include, but is not limited to, attributes such as cost efficiency, performance metrics, suitability for specific tasks or stages of the process, and user feedback or historical success rates. Apparatus may apply analytical algorithms to assess and compare data points for each resource. The comparison focuses on how each resource aligns with the specific requirements and objectives of the process, highlighting strengths, weaknesses, and areas of divergence. In comparison report, resources may be compared on a range of criteria that are pertinent to the process's goals. Comparison report may include a side-by-side comparison of performance metrics, cost analysis, efficiency ratings, and user satisfaction scores, among others. Comparison report may be designed to be user-friendly, presenting data in a clear, concise, and visually accessible format, such as charts, graphs, or tables, enabling users to quickly grasp the comparative advantages and disadvantages of each resource. Comparison report would provide an analytical overview of the differences and similarities between potential and optimal resources. Comparison report may include metrics, attributes, performance data, costs, benefits, and potentially other relevant parameters that help in evaluating and understanding the distinctions between the chosen optimal resource and other potential options. In a non-limiting example, apparatus may help an organization to sift through a range of potential resources, may include various fundraising platforms, marketing channels, event venues, and promotional strategies. Resources may include attributes such as cost, reach, effectiveness, and alignment with the organization's donor base. Apparatus may then select optimal resource; an online fundraising platform may align best with the organization's target demographic and budget. As the planning and execution of the fundraising event proceed, apparatus may generate comparison report. Comparison report may include selection of online platform with other potential resources that were considered but not chosen. Comparison reports may detail aspects such as, but not limited to the cost-effectiveness, reach, and donor engagement level of each resource. In another embodiment, apparatus 100 may further include a predictive modeling module configured to determine future performance of first stage 120 as a function of outlier cluster 152. Predictive modeling module may utilize advanced algorithms and machine learning techniques to analyze patterns and trends within outlier cluster, which consists of resources with unique or significantly different attributes. By processing this data, predictive modeling module may project how these distinctive attributes will impact the performance of first stage. For instance, a company may be planning a marketing campaign as first stage of a new product launch. Predictive modeling module may analyze outlier cluster that includes unconventional marketing channels or innovative strategies not typically used by the company. Based on attributes and historical performance data of these resources, module may forecast the potential success rate and audience reach allowing the company to make data-driven decisions about incorporating innovative strategies into their marketing campaign, potentially leading to higher engagement rates and a successful product launch. To enhance user interaction and decision-making, apparatus may be designed to display the identified subsequent stage comparison report to users. Subsequent stage may be presented to the users via a user interface, may outline the recommended actions, key metrics, and expected outcomes. Comparison report may provide a detailed analysis of various resources and their predicted performance. Comparison report may be displayed with graphical representations, tables, and charts that compare different marketing strategies and tools. Comparison report may highlight key differences and potential advantages.

With continued reference to FIG. 1, in some embodiments, processor may be configured to generate a display data structure. A "display data structure," for the purposes of this disclosure, is a data structure that is configured to cause information to be displayed on a display device. "display device," for the purposes of this disclosure, is a device that is configured to display information in a visual format to a user. Display device may include screens such as LCD, OLED, CRT, LED, and the like. In some embodiments, processor may be configured to transmit display data structure to a display device. In some embodiments, processor may be configured to display display data structure using a display device. In some embodiments, display data structure may include one or more stages from process 116. As a non-limiting example, display data structure may include a first stage 120 and subsequent stage 160. As a non-limiting example, display data structure may include comparison report 168.

With continued reference FIG. 1, in some embodiments, display data structure may include one or more event handlers. An "event handler," for the purposes of this disclosure, is a function that is executed by an application or operating system when an event is executed on the application or operating system. In some embodiments, event handler may monitor for user input. User input may include user feedback. In some embodiments, user input may include new or updated data, such as new potential resources please. In some embodiments, event handler may monitor for new or updated data and trigger processes described above for determining subsequent stage 160 to be rerun to include the new or updated data. As a non-limiting example, event handler may monitor for new or updated data and trigger local optimization process 164 to be rerun as a function of the new or updated data.

With continued reference to FIG. 1, in some embodiments, processor may be configured to accept user feedback. In some embodiments, processor may be configured to accept user feedback using a GUI, such as a GUI described with reference to FIG. 6. User feedback may include quantitative feedback, such as feedback on a scale of 0-5, 0-10, −1 to 1, 0-50, out of five stars, and the like. In some embodiments, user feedback may be used to tune training data for the various machine-learning models disclosed in this disclosure. In some embodiments, user feedback may be used to adjust optimal resource training data. As a non-limiting example, inputs and outputs from prior iterations of optimal resource machine-learning model may be added to optimal resource training data. In some embodiments, the training data entries for these inputs and outputs from prior iterations of optimal resource machine-learning model may be assigned weights as a function of user feedback. For example, if user feedback is positive, an associated training data entry may be assigned a larger weight and if user feedback is negative, an associated training data entry may be assigned a smaller weight. For instance, in a retail business, apparatus may be used to optimize inventory management. By selecting optimal resource for inventory tracking and applying local optimization constraints, business may significantly reduce overstock and understock situations, leading to improved cost savings and customer satisfaction.

Figure 2:
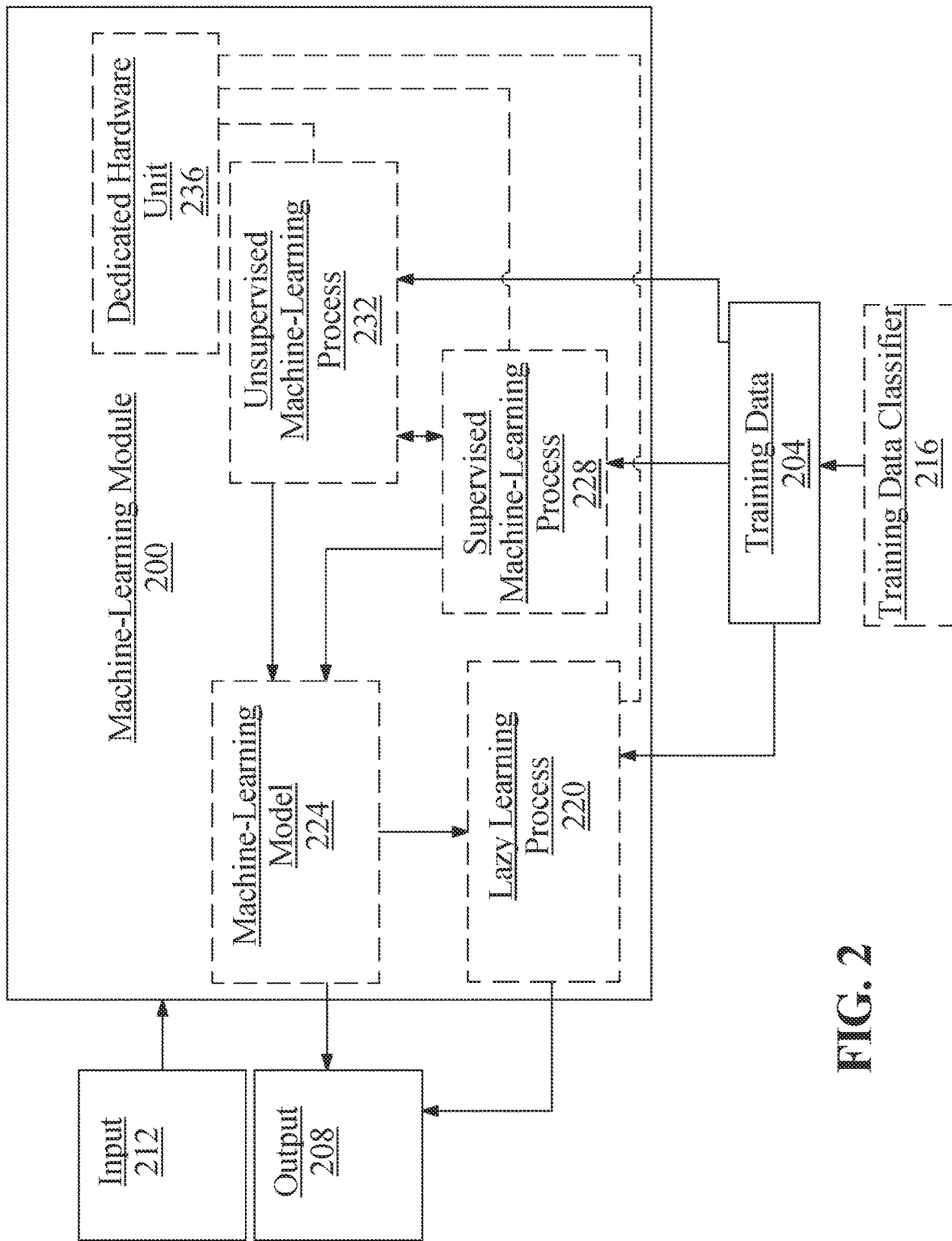
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustration of machine-learning module 200 may use training data 204 to learn patterns and correlations between various aspects of project management (input data) and successful project outcomes (output data). Learned model may be then applied to make informed decisions about optimizing future projects, thereby enhancing efficiency and effectiveness in the organization's project management processes.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to different cohorts based on departmental functions within an organization, such as marketing, finance, or operations. Each of these departments would have distinct process optimization needs and resource attributes. By classifying training data according to functional cohorts, classifier may ensure that training data fed into the machine learning model is more specific and relevant to the particular subject of analysis.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
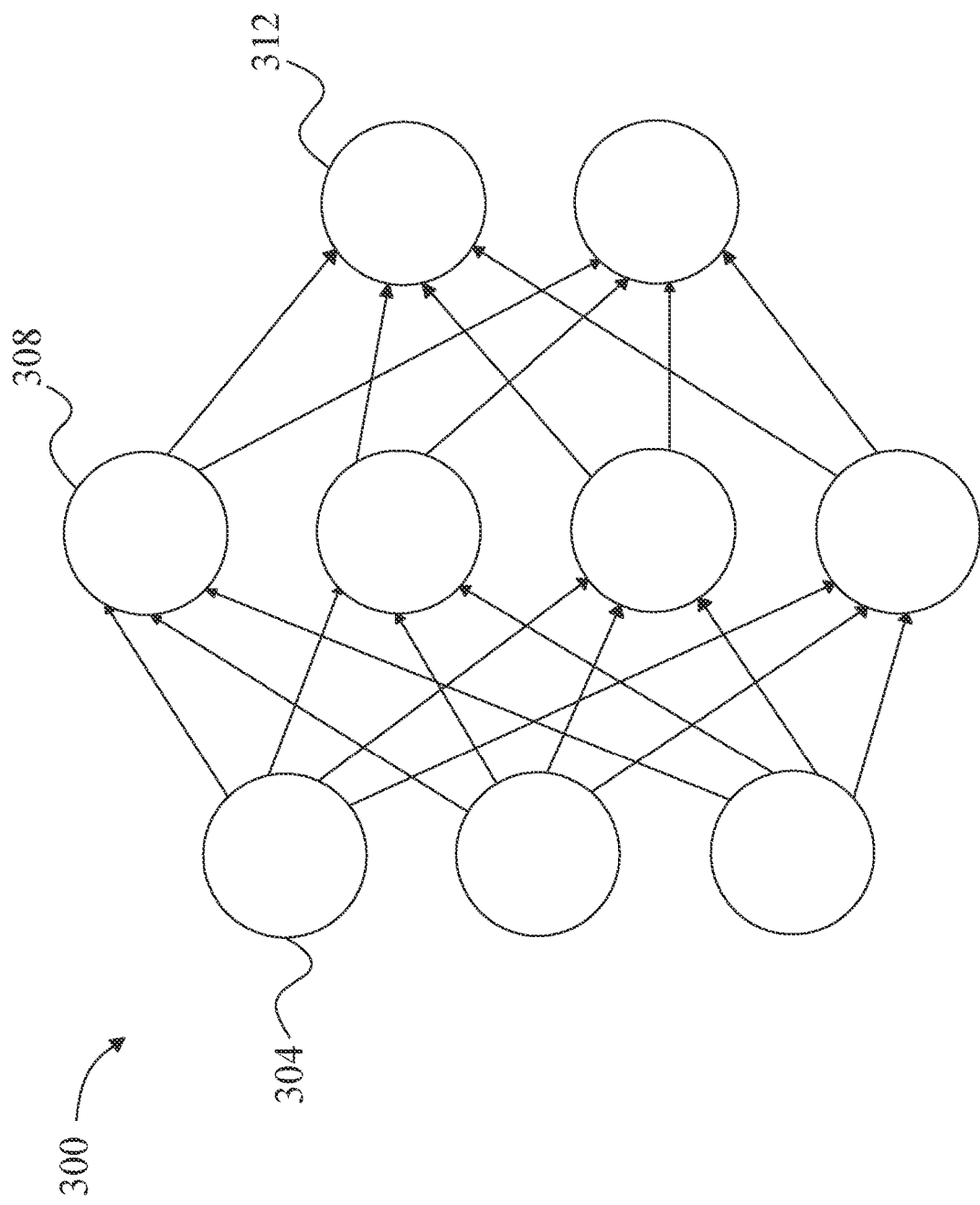
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
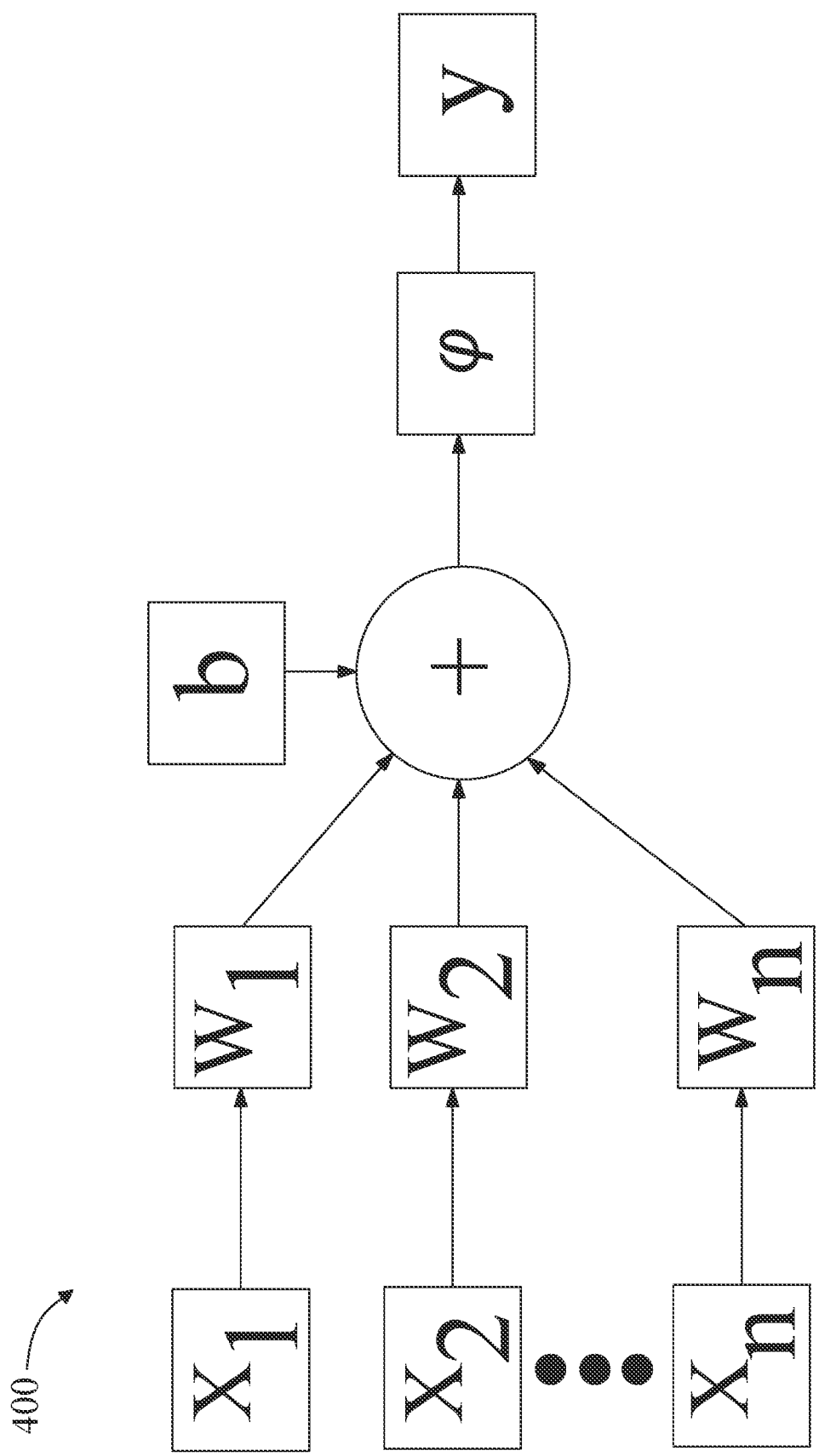
FIG. 4 is a diagram of an exemplary embodiment of a node of a neural network.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function ϕ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
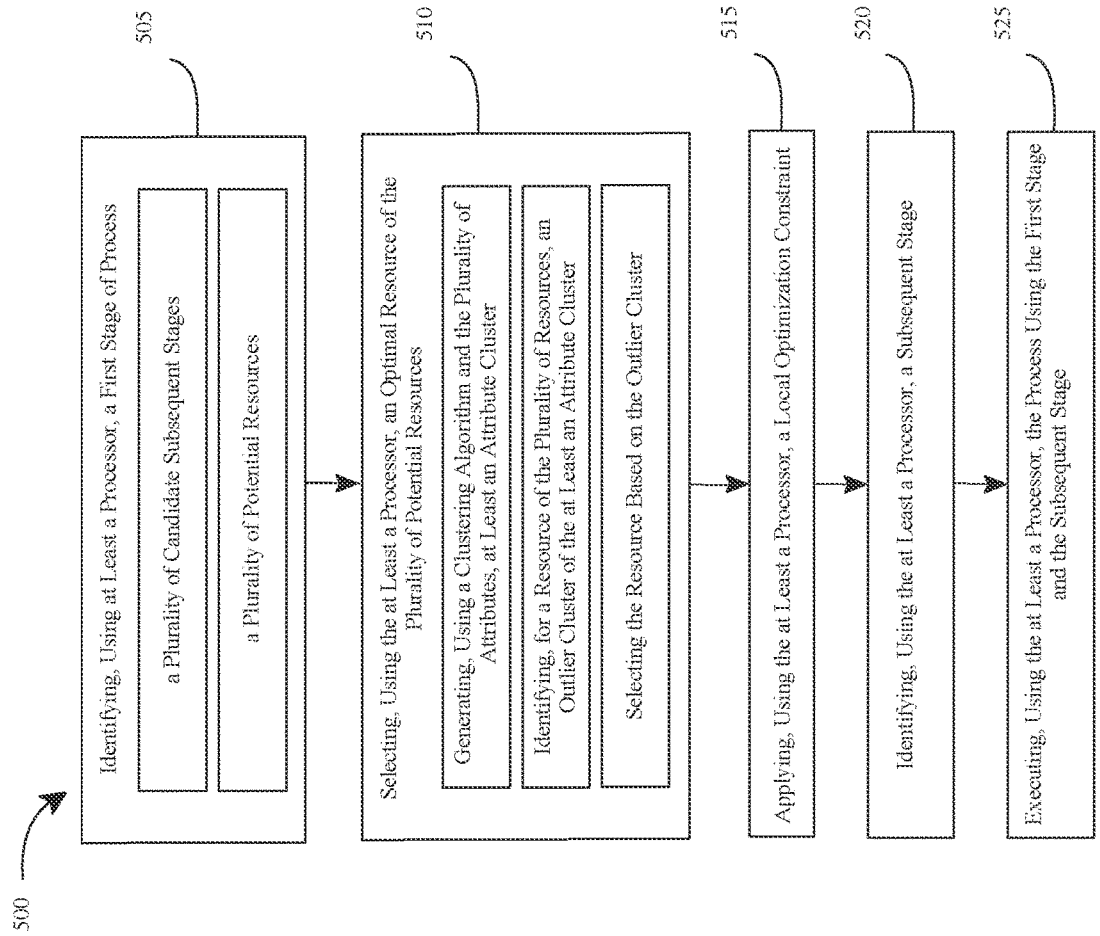
FIG. 5 is a flow diagram illustrating an exemplary workflow of a method for local optimization using unsupervised learning.

Referring now to FIG. 5, a flow diagram of an exemplary method 500 for local optimization using unsupervised learning is illustrated. Method 500 includes step 505 of identifying, using at least a processor, a first stage of process, wherein the first stage includes a plurality of candidate subsequent stages and a plurality of potential resources, each resource of the plurality of resources having a plurality of attributes. This may be implemented, without limitation, as described with reference to FIGS. 1-6.

With continued reference to FIG. 5, method 500 includes a step 510 of selecting, using the at least a processor, an optimal resource of the plurality of potential resources, wherein selecting further comprises generating, for each resource of the plurality of resources, using a clustering algorithm and the plurality of attributes, at least an attribute cluster, wherein selecting further comprises identifying, for a resource of the plurality of resources, an outlier cluster of the at least an attribute cluster and selecting the resource based on the outlier cluster. This may be implemented, without limitation, as described with reference to FIGS. 1-6.

With continued reference to FIG. 5, method 500 includes a step 515 of applying, using the at least a processor, a local optimization constraint, wherein the location optimization constraint further comprises the selected resources. This may be implemented, without limitation, as described with reference to FIGS. 1-6.

With continued reference to FIG. 5, method 500 includes a step 520 of identifying, using the at least a processor, a subsequent stage of the plurality of stages using a local optimization process having the local optimization constraint. This may be implemented, without limitation, as described with reference to FIGS. 1-6.

With continued reference to FIG. 5, method 500 may include a step 525 of executing, using the at least a processor, the process using the first stage and the subsequent stage. This may be implemented, without limitation, as described with reference to FIGS. 1-6.

Figure 6:
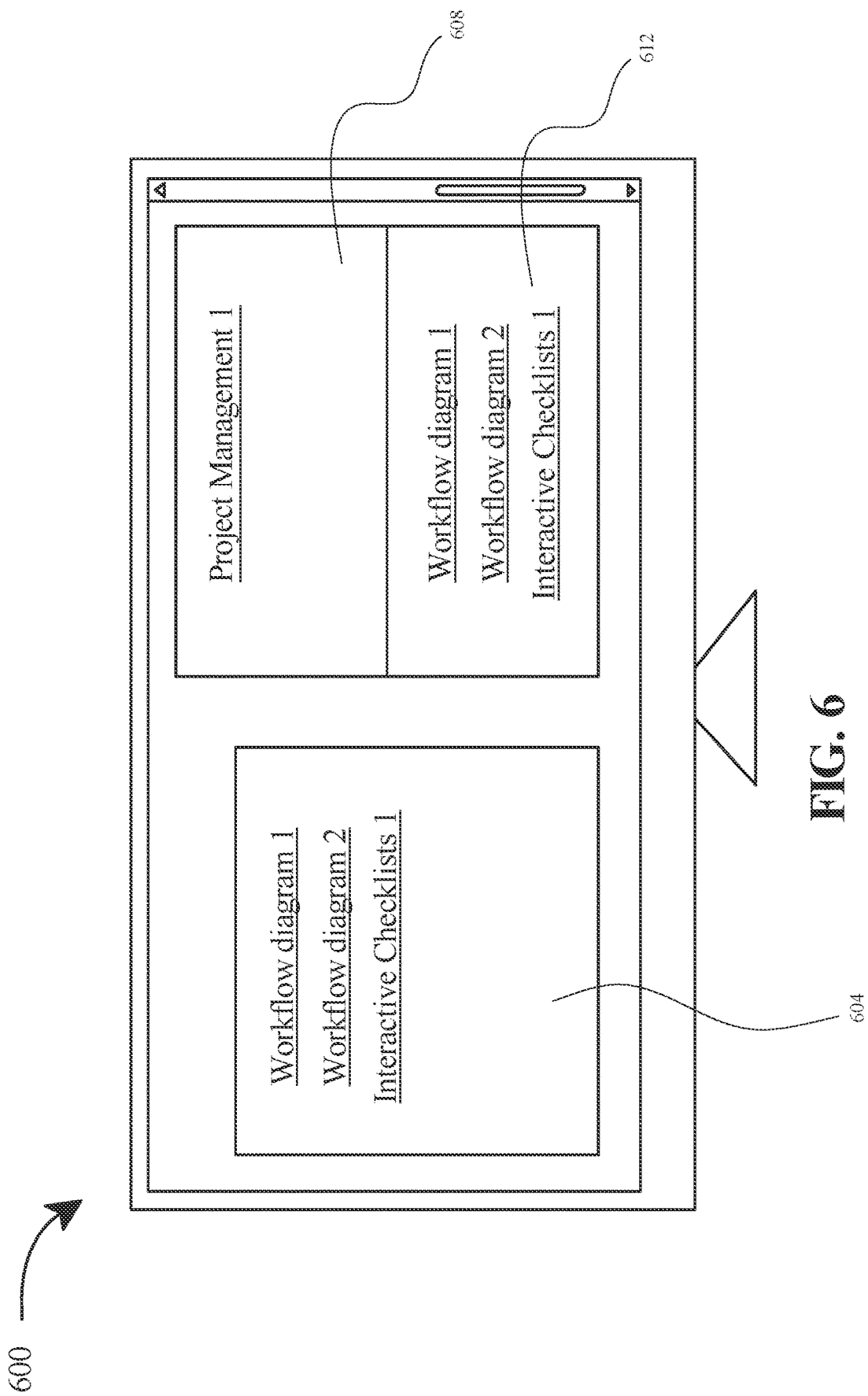
FIG. 6 is an illustration of an exemplary graphical user interface.

Now referring to FIG. 6, a non-limiting example of one or more GUI elements is illustrated. In some embodiments, GUI 600, and/or one or more elements of GUI 600 may be displayed on a user device. GUI elements may include, without limitation, a field for subsequent stages 604 and a field for comparison report comprises potential resources 608 and optimal resources 612 determined by apparatus 100. In some embodiments, processor 104 may transmit to a user device a data structure that configures the user device to display GUI 600 and/or one or more elements of GUI 600; in some embodiments, such a data structure may include a visual element data structure.

Still referring to FIG. 6, in some embodiments, GUI 600 may include a field for subsequent stage 604. In some embodiments, field 604 may accept user inputs of entity data in the form of files, such as text files. In some embodiments, a user may "drag and drop" a file into field 604 in order to upload the file. In some embodiments, a user may directly input entity data into field 604, such as by pasting text into the field. In some embodiments, entity data 128 may be input into field 604. In some embodiment, field 604 may accept user inputs of image files.

Still referring to FIG. 6, in some embodiments, GUI 600 may include a field for comparing report of potential resource 608. In some embodiments, the contents of field 608 may be automatically generated and displayed to a user in field 608 as a function of process 116 input into field 604. In some embodiments, field 608 includes attributes and/or attribute clusters associated with first stage 120. In some embodiments, attributes in field 608 are organized by attribute cluster. In some embodiments, a user may select an item in field 608 by clicking on it. In some embodiments, a user selection of an item in field 608 may cause it to become highlighted. In some embodiments, items automatically populated into field 608 may be ordered according to a measure of their uniqueness in comparison to attributes and/or attribute clusters of other entities.

Still referring to FIG. 6, in some embodiments, GUI 600 may include a field displaying comparison report of optimal resources 612. In some embodiments, apparatus 100 may populate field 612 as a function of a selection of an attribute and/or attribute cluster by a user in field 608. In some embodiments, outlier cluster 152 and/or one or more relative attributes 136 associated with outlier cluster 1152 are displayed such that they are associated with subsequent stage 160 in field 612.

Still referring to FIG. 6, in some embodiments, a computing device may display and/or configure a user device to display GUI 600 and/or may display and/or configure a user device to display a change in GUI 600 as a result of an event. In some embodiments, a computing device displaying and/or configuring a user device to display GUI 600 may produce a signal when an event occurs, and the computing device may modify GUI 600 as a result of the signal. Events may include, in non-limiting examples, a user hovering the cursor over an element, a user clicking on an element, a user pressing a key on a keyboard, a video ending, a user scrolling a mouse wheel, an error occurring, and the like. In some embodiment, a computing device may include event handler code that runs when an event occurs, causing a change in GUI 600. As non-limiting examples, events may result in a request being sent to an API, playing an animation, copying data to the clipboard, and entering full screen mode. As a non-limiting example, an event may include clicking on an attribute in field 608, and this may cause event handler code to cause the computing device to identify one or more processes associated with that attribute and display them in field 612.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
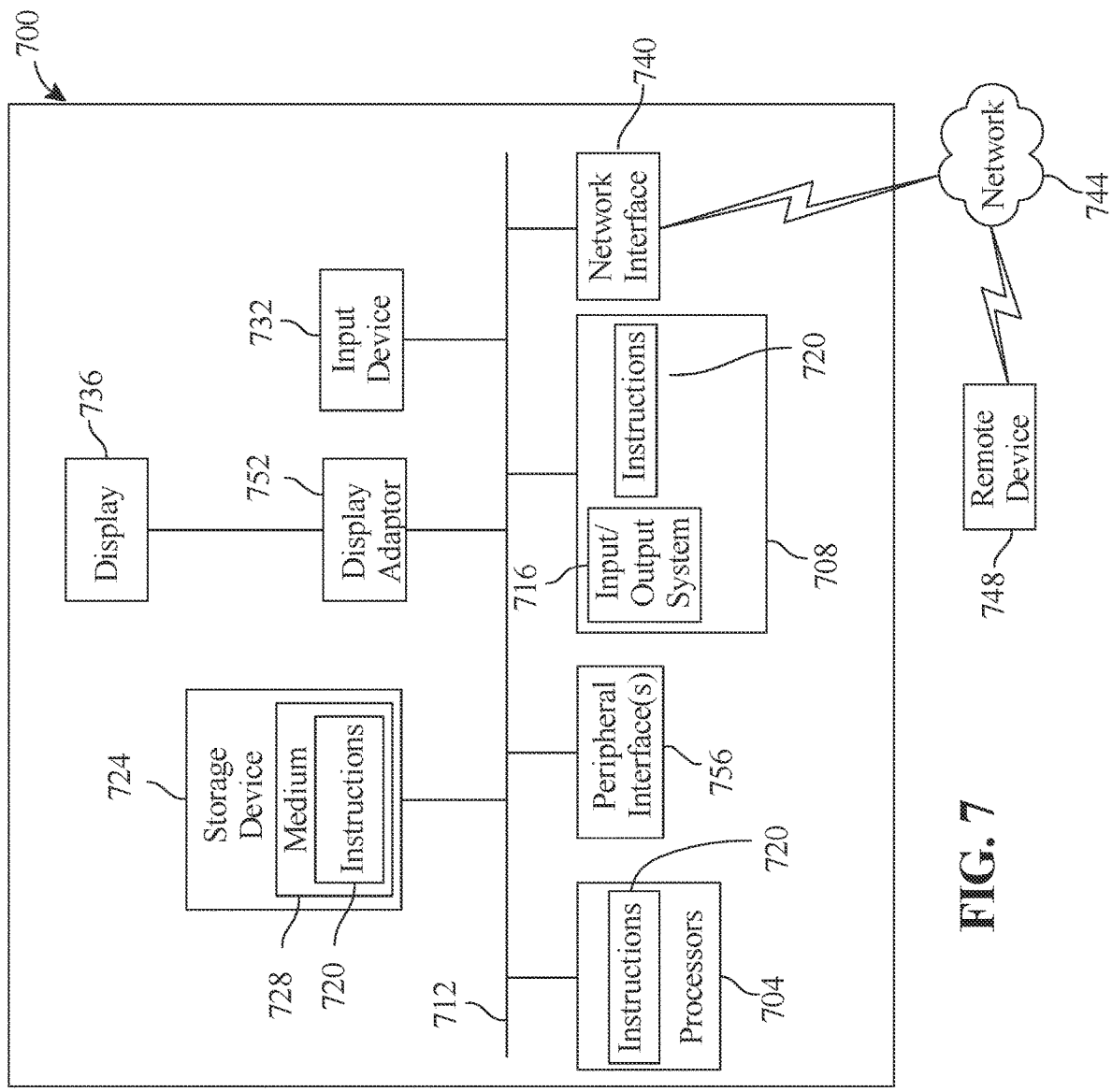
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for local optimization using unsupervised learning, the apparatus comprising:
    at least a processor; and
    a memory communicatively connected to the at least a processor, the memory containing instructions configuring the at least a processor to:
        identify a first stage of a process, wherein the first stage includes:
            a plurality of candidate subsequent stages; and
            a plurality of potential resources, each resource of the plurality of potential resources having a plurality of attributes;
        generate an optimal resource using an unsupervised support vector machine comprising an optimal resource machine-learning model which comprises:
            receiving optimal resource training data, wherein the optimal resource training data correlates a plurality of potential resource data to a plurality of optimal resource data;
            sanitizing the optimal resource training data using a dedicated hardware unit comprising circuitry configured to perform signal processing operations, wherein sanitizing the optimal resource training data comprises:
                determining by the dedicated hardware unit that a training data entry of the optimal resource training data has a signal to noise ratio below a threshold value; and
                removing the training data entry from the optimal resource training data to create sanitized optimal resource training data;
            training, iteratively, the optimal resource machine-learning model using the sanitized optimal resource training data, wherein training the optimal resource machine-learning model includes retraining the optimal resource machine-learning model with feedback from previous iterations of the optimal resource machine-learning model; and
            generating the optimal resource using the trained optimal resource machine-learning model;
        select the optimal resource of the plurality of potential resources, wherein selecting the optimal resource further comprises:
            generating, for each resource of the plurality of resources, using a clustering algorithm and the plurality of attributes, at least an attribute cluster;

identifying, for a resource of the plurality of resources, an outlier cluster of the at least an attribute cluster; and selecting the optimal resource based on the outlier cluster;

apply a local optimization constraint to a local optimization process, wherein the local optimization constraint comprises the optimal resource;

identify a subsequent stage of the plurality of stages using the local optimization process, wherein identifying the subsequent stage further comprises processing real-time data;

generate a comparison report between the plurality of potential resources and the optimal resource as a function of the identified subsequent stage, wherein the comparison report provides an analysis of strategies and outputs expected outcomes;

submit the comparison report via a graphical representation;

employ one or more event handlers designed to detect the submission, wherein the one or more event handlers trigger an analysis when a new submission is received;

initiate a reassessment of the selected optimal resource in real-time using the one or more event handlers; and automatically update the selected optimal resource as a function of the reassessment, wherein the updated optimal resource is displayed via a graphical representation.

2. The apparatus of claim 1, wherein selecting the optimal resource further comprises using an unsupervised learning algorithm to analyze the plurality of attributes.

3. The apparatus of claim 1, wherein the memory contains instructions further configuring the at least a processor to select at least a relevant attribute from the plurality of attributes using a selection mechanism.

4. The apparatus of claim 1, wherein the apparatus is further configured to automatically update the optimal resource as a function of a change in process.

5. The apparatus of claim 1, wherein the memory contains instructions configuring the at least a processor to generate a display data structure, wherein the display data structure comprises the subsequent stage.

6. The apparatus of claim 1, wherein the memory contains instructions further configuring the at least a processor to:
generate the optimal resource using an optimal resource machine-learning model,
wherein the optimal resource machine-learning model is trained using optimal resource training data;
receive user feedback; and
adjust the optimal resource training data as a function of the user feedback.

7. The apparatus of claim 1, wherein the apparatus is further configured to update the optimal resource and local optimization constraints as a function of real-time data.

8. The apparatus of claim 1, wherein the local optimization process comprises:
receiving local optimization training data, wherein the local optimization training data comprises associated preceding stages and local optimization constraints correlated to subsequent stages;
training a local optimization machine-learning model using the local optimization training data; and
determining, using the local optimization machine-learning model, the subsequent stage of the plurality of stages.

9. A method for local optimization using unsupervised learning, the method comprising:
identifying, using at least a processor, a first stage of process, wherein the first stage includes:
a plurality of candidate subsequent stages; and
a plurality of potential resources, each resource of the plurality of potential resources having a plurality of attributes;
generating, using the at least a processor, an optimal resource using an unsupervised support vector machine comprising an optimal resource machine-learning model which comprises:
receiving optimal resource training data, wherein the optimal resource training data correlates a plurality of potential resource data to a plurality of optimal resource data;
sanitizing the optimal resource training data using a dedicated hardware unit comprising circuitry configured to perform signal processing operations, wherein sanitizing the optimal resource training data comprises:
determining by the dedicated hardware unit that a training data entry of the optimal resource training data has a signal to noise ratio below a threshold value; and
removing the training data entry from the optimal resource training data to create sanitized optimal resource training data;
training, iteratively, the optimal resource machine-learning model using the sanitized optimal resource training data, wherein training the optimal resource machine-learning model includes retraining the optimal resource machine-learning model with feedback from previous iterations of the optimal resource machine-learning model; and
generating the optimal resource using the trained optimal resource machine-learning model;
selecting, using the at least a processor, an optimal resource of the plurality of potential resources, wherein selecting the optimal resource further comprises:
generating, for each resource of the plurality of resources, using a clustering algorithm and the plurality of attributes, at least an attribute cluster;
identifying, for a resource of the plurality of resources, an outlier cluster of the at least an attribute cluster; and
selecting the optimal resource based on the outlier cluster;
applying, using the at least a processor, a local optimization constraint to a local optimization process, wherein the local optimization constraint comprises the selected optimal resources;
identifying, using the at least a processor, a subsequent stage of the plurality of stages using a local optimization process having the local optimization constraint, wherein identifying the subsequent stage further comprises processing real-time data;
generating, using the at least a processor, a comparison report between the plurality of potential resources and the optimal resource as a function of the identified subsequent stage, wherein the comparison report provides an analysis of strategies and outputs expected outcomes;
submitting, using the at least a processor, the comparison report via a graphical representation;
employing, using the at least a processor, one or more event handlers designed to detect the submission, wherein the one or more event handlers trigger an analysis when a new submission is received;

initiating, using the at least a processor, a reassessment of the selected optimal resource in real-time using the one or more event handlers; and automatically updating, using the at least a processor, the selected optimal resource as a function of the reassessment, wherein the updated optimal resource is displayed via a graphical representation.

10. The method of claim 9, wherein selecting the optimal resource further comprises using an unsupervised learning algorithm to analyze the plurality of attributes.

11. The method of claim 9, further comprising selecting, using the at least a processor, at least a relevant attribute from the plurality of attributes using a selection mechanism.

12. The method of claim 9, further comprising updating, using the at least a processor, the optimal resource and in response to change in process.

13. The method of claim 9, further comprising generating, using the at least a processor, a display data structure, wherein the display data structure comprises the subsequent stage.

14. The method of claim 9, further comprising:
generating, using the at least a processor, the optimal resource using an optimal resource machine-learning model, wherein the optimal resource machine-learning model is trained using optimal resource training data;

receiving, using the at least a processor, user feedback; and adjusting, using the at least a processor, the optimal resource training data as a function of the user feedback.

15. The method of claim 9, further comprising updating, using the at least a processor, the optimal resource and local optimization constraints as a function of real-time data.

16. The method of claim 9, wherein the local optimization process comprises:

receiving local optimization training data, wherein the local optimization training data comprises associated preceding stages and local optimization constraints correlated to subsequent stages;

training a local optimization machine-learning model using the local optimization training data; and determining, using the local optimization machine-learning model, the subsequent stage of the plurality of stages.

* * * * *